United States Patent

Hester, Jr.

[15] 3,694,552

[45] Sept. 26, 1972

[54] 3-(5-PHENYL-3H-1,4-BENZODIAZEPIN-2-YL) CARBAZIC ACID AND ALKYL ESTERS IN THERAPEUTIC COMPOSITIONS AND METHOD

[72] Inventor: Jackson B. Hester, Jr., Galesburg, Mich.

[73] Assignee: The Upjohn Company, Kalamazoo, Mich.

[22] Filed: Nov. 18, 1971

[21] Appl. No.: 200,203

Related U.S. Application Data

[63] Continuation-in-part of Ser. No. 852,112, Aug. 21, 1969, Pat. No. 3,646,055.

[52] U.S. Cl. ............................424/244, 260/239 BD
[51] Int. Cl. ...............................................A61k 27/00
[58] Field of Search.............SN/852, 112; 424/244; 260/239 BD

[56] References Cited

OTHER PUBLICATIONS

Meguro et al., Tetrehedron Letters, No. 47, pp. 4039–4042 (1970).

Primary Examiner—Stanley J. Friedman
Attorney—John J. Killinger et al.

[57] ABSTRACT

Therapeutic compositions for treating humans and animals comprising, in unit dosage form, 3-(5-phenyl-3H-1,4-benzodiazepin-2-yl)carbazic acid and alkyl esters of the formula)

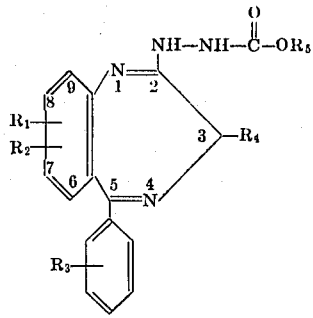

wherein $R_1$, $R_2$, and $R_3$ are selected from the group consisting of hydrogen, alkyl of 1 to 3 carbon atoms, inclusive, halogen, nitro, cyano, trifluoromethyl, and alkoxy, alkylthio, alkylsulfinyl, alkylsulfonyl, alkanoylamino, and dialkylamino, in which the carbon chain moieties are of 1 to 3 carbon atoms, inclusive, and wherein $R_4$ and $R_5$ is selected from the group consisting of hydrogen and alkyl of 1 to 3 carbon atoms, inclusive, in combination with a pharmaceutical carrier. The compositions have CNS depressant activity and are useful as sedatives, hypnotics and tranquilizers. The compositions are also useful as muscle relaxants and anticonvulsants. The compositions can be administered to human or animal subjects.

11 Claims, No Drawings

3-(5-PHENYL-3H-1,4-BENZODIAZEPIN-2-YL) CARBAZIC ACID AND ALKYL ESTERS IN THERAPEUTIC COMPOSITIONS AND METHOD

CROSS REFERENCE TO RELATED APPLICATION

This application is a continuation-in-part of application Ser. No. 852,112, filed Aug. 21, 1969, now U.S. Pat. No. 3,646,055 issued Feb. 29, 1972.

BRIEF SUMMARY OF THE INVENTION

This invention is a therapeutic composition for treating humans and animals comprising a benzodiazepine of the Formula I and pharmacologically acceptable acid addition salts thereof in combination with a pharmaceutical carrier and a method for therapeutic treatment.

DETAILED DESCRIPTION

The compounds of the Formula I can be prepared by methods disclosed in co-pending application Ser. No. 852,112, filed Aug. 21, 1969.

The compositions of the present invention are presented for administration to humans and animals in unit dosage forms, such as tablets, capsules, pills, powders, granules, sterile parenteral solutions or suspensions, and oral solutions or suspensions, and oil in water and water in oil emulsions containing suitable quantities of the compound of Formula I.

For oral administration either solid or fluid unit dosage forms can be prepared. For preparing solid compositions such as tablets, the compound of Formula I is mixed with conventional ingredients such as talc, magnesium stearate, dicalcium phosphate, magnesium aluminum silicate, calcium sulfate, starch, lactose, acacia, methylcellulose, and functionally similar materials as pharmaceutical diluents or carriers. Wafers are prepared in the same manner as tablets, differing only in shape and the inclusion of sucrose or other sweetener and flavor. In their simplest embodiment, capsules, like tablets, are prepared by mixing the compound with an inert pharmaceutical diluent and filling the mixture into a hard gelatin capsule of appropriate size. Soft gelatin capsules are prepared by machine encapsulation of a slurry of the compound with an acceptable vegetable oil, light liquid petrolatum or other inert oil.

Fluid unit dosage forms for oral administration such as syrups, elixirs, and suspensions can be prepared. The water-soluble forms can be dissolved in an aqueous vehicle together with sugar, aromatic flavoring agents and preservatives to form a syrup. An elixir is prepared by using a hydro-alcoholic (ethanol) vehicle with suitable sweeteners such as sugar and saccharin, together with an aromatic flavoring agent.

Suspensions can be prepared with a syrup vehicle with the aid of a suspending agent such as acacia, tragacanth, methylcellulose and the like.

For parenteral administration, fluid unit dosage forms are prepared utilizing the compound and a sterile vehicle, water being preferred. The compound, depending on the vehicle and concentration used, can be either suspended or dissolved in the vehicle. In preparing solutions the compound can be dissolved in water for injection and filter sterilized before filling into an suitable vial or ampul and sealing. Advantageously, adjuvants such as a local anesthetic, preservative and buffering agents can be dissolved in the vehicle. To enhance the stability, the composition can be frozen after filling into the vial and the water removed under vacuum. The dry lyophilized powder is then sealed in the vial and an accompanying vial of water for injection is supplied to reconstitute the liquid prior to use. Parenteral suspensions are prepared in substantially the same manner except that the compound is suspended in the vehicle instead of being dissolved and sterilization cannot be accomplished by filtration. The compound can be sterilized by exposure to ethylene oxide before suspending in the sterile vehicle. Advantageously, a surfactant or wetting agent is included in the composition to facilitate uniform distribution of the compound.

The term unit dosage form as used in the specification and claims refers to physically discrete units suitable as unitary dosages for human subjects and animals, each unit containing a predetermined quantity of active material calculated to produce the desired therapeutic effect in association with the required pharmaceutical diluent, carrier, or vehicle. The specifications for the novel unit dosage forms of this invention are dictated by and directly dependent on (a) the unique characteristics of the active material and the particular effect to be achieved, and (b) the limitations inherent in the art of compounding such an active material for use in humans and animals, as disclosed in detail in this specification, these being features of the present invention. Examples of suitable unit dosage forms in accord with this invention are tablets, capsules, pills, suppositories, powder packets, granules, wafers, cachets, teaspoonfuls, tablespoonfuls, dropperfuls, ampuls, vials, segregated multiples of any of the foregoing, and other forms as herein described.

The dosage of the compound for treatment depends on route of administration; the age, weight, and condition of the patient. A dosage schedule of from about 10 to 200 mg. in a single or divided dose, embraces the effective therapeutic range for which the compositions are effective. The dosage to be administered is calculated on the basis of from about 0.1 to about 5 mg./kg. by weight of subject.

The compound is compounded with a suitable pharmaceutical carrier in unit dosage form for convenient and effective administration. In the preferred embodiments of this invention, the dosage units contain the compound in: 10, 25, 50, and 100 mg. amounts for systemic treatment; and 0.1 percent to 5.0 percent w/v for parenteral treatment. The dosage of compositions containing a compound of Formula I and one or more other active ingredients is to be determined with reference to the usual dosage of each such ingredient.

In addition to the administration of a compound of Formula I as the principle active ingredient of compositions for treatment of the conditions described herein, the said compound can be combined with other compounds to obtain advantageous combinations of properties. Such combinations include a compound of Formula I with other hypnotics, for example, barbital, 65 to 400 mg.; phenobarbital, 16 to 250 mg.; amobarbital, 65 to 200 mg.; hexobarbital, 250 to 500 mg.; chloral hydrate, 250 to 500 mg.; and methyprylon, 100 to 400 mg.

The following examples are illustrative of the best mode contemplated by the inventor for carrying out this invention and are not to be construed as limiting.

EXAMPLE 1

A lot of 10,000 tablets, each containing 10 mg. of 3-(7-chloro-5-phenyl-3H-1,4-benzodiazepin-2-yl)carbazic acid ethyl ester is prepared from the following types and amounts of ingredients:

| | |
|---|---|
| 3-(7-chloro-5-phenyl-3H-1,4-benzodiazepin-2-yl)carbazic acid ethyl ester | 100 gm. |
| Dicalcium phosphate | 1,500 gm. |
| Methylcellulose, U.S.P. (15 cps.) | 60 gm. |
| Talc | 150 gm. |
| Corn starch | 200 gm. |
| Calcium stearate | 12 gm. |

The compound and dicalcium phosphate are mixed well, granulated with 7.5 percent solution of methylcellulose in water, passed through a No. 8 screen and dried carefully. The dried granules are passed through a No. 12 screen, mixed thoroughly with the talc, starch and stearate, and compressed into tablets.

These tablets are useful in inducing sleep in children at a dose of 1 to 2 tablets at bedtime depending on the age and weight of the patient.

EXAMPLE 2

One thousand two-piece hard gelatin capsules, each containing 10 mg. of 3-(7-chloro-5-phenyl-3H-1,4-benzodiazepin-2-yl)carbazic acid ethyl ester are prepared from the following types and amounts of ingredients:

| | |
|---|---|
| 3-(7-chloro-5-phenyl-3H-1,4-benzodiazepin-2-yl)carbazic acid ethyl ester | 10 gm. |
| Talc | 25 gm. |
| Magnesium stearate | 250 gm. |

The ingredients are mixed well and filled into capsules of the proper size.

Capsules so prepared are useful to produce tranquilization in adults at a dose of one capsule.

EXAMPLE 3

One thousand tablets for sublingual use are prepared from the following ingredients:

| | |
|---|---|
| 3-(7-chloro-5-phenyl-3H-1,4-benzodiazepin-2-yl)carbazic acid ethyl ester | 25 gm. |
| Polyethylene glycol 4,000, powdered | 150 gm. |
| Polyethylene glycol 6,000, powdered | 75 gm. |

The ingredients are mixed well and compressed into sublingual-type tablets weighing 250 mg.

These tablets placed under the tongue are useful in producing tranquilization in adults at a dose of 1 tablet.

EXAMPLE 4

Soft gelatin capsules for oral use, each containing 100 mg. of 3-(7-chloro-5-phenyl-3H-1,4-benzodiazepin-2-yl)-carbazic acid ethyl ester are prepared by first dispersing the micronized compound in corn oil to render the material capsulatable and then encapsulating in the usual manner.

One capsule taken orally by an adult reduces anxiety.

EXAMPLE 5

One thousand tablets, each containing 50 mg. of 3-(7-chloro-5-phenyl-3H-1,4-benzodiazepin-2-yl)carbazic acid ethyl ester are made from the following types and amounts of ingredients:

| | |
|---|---|
| 3-(7-chloro-5-phenyl-3H-1,4-benzodiazepin-2-yl)carbazic acid ethyl ester | 50 gm. |
| Lactose | 310 gm. |
| Microcrystalline cellulose NF | 120 gm. |
| Starch | 16 gm. |
| Magnesium stearate powder | 4 gm. |

The ingredients are screened and blended together and pressed into 500 mg. tablets.

The tablets are useful to reduce anxiety in adults.

EXAMPLE 6

A sterile preparation suitable for intramuscular injection and containing 10 mg. of 3-(7-chloro-5-phenyl-3H-1,4-benzodiazepin-2-yl)carbazic acid ethyl ester in each milliliter is prepared from the following ingredients:

| | | |
|---|---|---|
| 3-(7-chloro-5-phenyl-3H-1,4-benzodiazepin-2-yl)carbazic acid ethyl ester | 10 | gm. |
| Benzyl benzoate | 200 | gm. |
| Methylparaben | 1.5 | gm. |
| Propylparaben | 0.5 | gm. |
| Cottonseed oil q.s. | 1,000 | ml. |

One milliliter of this sterile preparation is injected to reduce anxiety prior to surgical procedures in adults.

EXAMPLE 7

Following the procedure of the preceding Examples 1 through 6, inclusive, dosage forms are similarly performed substituting an equal amount each of 3-(7-chloro-5-(o-chlorophenyl)-3H-1,4-benzodiazepin-2-yl)-carbazic acid ethyl ester;

3-(6-chloro-5-phenyl-3H-1,4-benzodiazepin-2-yl)carbazic acid ethyl ester;

3-(7-nitro-5-phenyl-3H-1,4-benzodiazepin-2-yl)carbazic acid ethyl ester;

3-(7-fluoro-5-phenyl-3H-1,4-benzodiazepin-2-yl)carbazic acid ethyl ester;

3-(7-trifluoromethyl-5-phenyl-3H-1,4-benzodiazepin-2-yl)-carbazic acid ethyl ester;

3-(7-cyano-5-phenyl-3H-1,4-benzodiazepin-2-yl)carbazic acid ethyl ester;

3-(7-chloro-5-(o-chlorophenyl)-3H-1,4-benzodiazepin-2-yl)-carbazic acid methyl ester;

3-(6-ethylthio-5-(o-bromophenyl)-3H-1,4-benzodiazepin-2-yl)carbazic acid methyl ester;

3-(6,8-dichloro-5-(o-fluorophenyl)-3H-1,4-benzodiazepin-2-yl)carbazic acid ethyl ester;

3-(8-nitro-5-(o-chlorophenyl)-3H-1,4-benzodiazepin-2-yl)-carbazic acid methyl ester;

3-(7-bromo-5-(o-bromophenyl)-3H-1,4-benzodiazepin-2-yl)-carbazic acid ethyl ester;

3-(7-methylsulfinyl-5-(o-fluorophenyl)-3H-1,4-benzodiazepin-2-yl)carbazic acid propyl ester;

3-(9-propylsulfonyl-7-methyl-5-phenyl-3H-1,4-benzodiazepin-2-yl)carbazic acid isopropyl ester;

3-(7-dimethylamino-5-phenyl-3H-1,4-benzodiazepin-2-yl)carbazic acid ethyl ester;

3-(7,8-dicyano-5-(p-methylsulfonylphenyl)-3H-1,4-benzodiazepin-2-yl)carbazic acid ethyl ester;

3-(6-chloro-5-(m-bromophenyl)-3H-1,4-benzodiazepin-2-yl)-carbazic acid ethyl ester;
3-(7-methyl-5-phenyl-3H-1,4-benzodiazepin-2-yl)carbazic acid ethyl ester;
for the 3-(7-chloro-5-phenyl-3H-1,4-benzodiazepin-2-yl)-carbazic acid ethyl ester of the examples.

I claim:

1. A therapeutic composition comprising in unit dosage form, from about 10 to about 200 mg. of a compound of the formula;

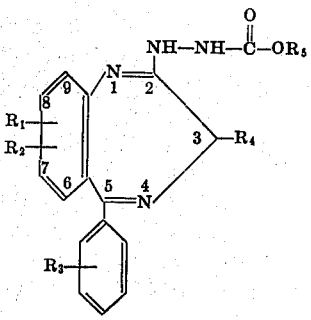

wherein $R_1$, $R_2$, and $R_3$ are selected from the group consisting of hydrogen, alkyl of one to three carbon atoms, inclusive, halogen, nitro, cyano, trifluoromethyl, and alkoxy, alkylthio, alkylsulfinyl, alkylsulfonyl, alkanoylamino, and dialkylamino, in which the carbon chain moieties are of one to three carbon atoms, inclusive, and wherein $R_4$ and $R_5$ is selected from the group consisting of hydrogen and alkyl of one to three carbon atoms inclusive, including the pharmacologically acceptable acid addition salts thereof in association with a pharmaceutical carrier.

2. The composition of claim 1 wherein the compound is 3-(7-chloro-5-phenyl-3H-1,4-benzodiazepin-2-yl)carbazic acid, ethyl ester.

3. The composition of claim 1 wherein the compound is 3-(7-chloro-5-(o-chlorophenyl)-3H-1,4-benzodiazepin-2-yl)- carbazic acid ethyl ester.

4. A process for reducing anxiety comprising the administration to a human or animal subject of a tranquilizing amount of a compound of the formula:

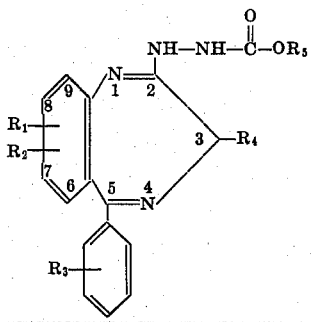

wherein $R_1$, $R_2$, and $R_3$ are selected from the group consisting of hydrogen, alkyl of one to three carbon atoms, inclusive, halogen, nitro, cyano, trifluoromethyl, and alkoxy, alkylthio alkylsulfinyl, alkylsulfonyl, alkanoylamino, and dialkylamino, in which the carbon chain moieties are of one to three carbon atoms, inclusive, and wherein $R_4$ and $R_5$ is selected from the group consisting of hydrogen and alkyl of one to three carbon atoms inclusive, in association with a pharmaceutical carrier.

5. The process of claim 4 wherein from about 10 to about 200 mg. of the compound is administered.

6. The process of claim 4 wherein the compound is 3-(7-chloro-5-phenyl-3H-1,4-benzodiazepin-2-yl)carbazic acid, ethyl ester and the amount administered is from about 10 to about 200 mg.

7. A process of claim 4 wherein the compound is 3-(7-chloro-5-(o-chlorophenyl)-3H-1,4-benzodiazepin-2-yl)-carbazic acid ethyl ester and the amount administered is for about 10 to about 200 mg.

8. A process for inducing sleep comprising the administration to a human or animal subject of a hypnotic amount of a compound of the formula:

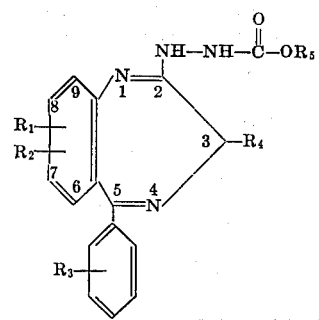

wherein $R_1$, $R_2$, and $R_3$ are selected from the group consisting of hydrogen, alkyl of one to three carbon atoms, inclusive, halogen, nitro, cyano, trifluoromethyl, and alkoxy, alkylthio, alkylsulfinyl, alkylsulfonyl, alkanoylamino, and dialkylamino, in which the carbon chain moieties are of one to three carbon atoms, inclusive, and wherein $R_4$ and $R_5$ is selected from the group consisting of hydrogen and alkyl of 1 to 3 carbon atoms inclusive, in association with a pharmaceutical carrier.

9. The process of claim 8 wherein from about 10 to about 200 mg. of the compound is administered.

10. The process of claim 8 wherein the compound is 3-(7-chloro-5-phenyl-3H-1,4-benzodiazepin-2-yl)carbazic acid ethyl ester and the amount administered is from about 10 to about 200 mg.

11. The process of claim 8 wherein the compound is 3-(7-chloro-5-(o-chlorophenyl)-b 3H-1,4-benzodiazepin-2-yl)-carbazic acid ethyl ester.

* * * * *

PO-1050
(5/69)

UNITED STATES PATENT OFFICE
CERTIFICATE OF CORRECTION

Patent No. 3,694,552          Dated September 26, 1972

Inventor(s) Jackson B. Hester, Jr.

It is certified that error appears in the above-identified patent and that said Letters Patent are hereby corrected as shown below:

Column 6, line 53, "-chlorophenyl)-b-" should read -- -chlorophenyl)-3H- --.

Signed and sealed this 6th day of March 1973.

(SEAL)
Attest:

EDWARD M. FLETCHER, JR.          ROBERT GOTTSCHALK
Attesting Officer                Commissioner of Patents